(12) United States Patent
Yun

(10) Patent No.: US 10,576,955 B2
(45) Date of Patent: Mar. 3, 2020

(54) EMERGENCY BRAKING CONTROL SYSTEM USING LIMITED SLIP DIFFERENTIAL AND CONTROL METHOD THEREOF

(71) Applicants: Hyundai Motor Company, Seoul (KR); Kia Motors Corporation, Seoul (KR)

(72) Inventor: Jae Min Yun, Yongin-si (KR)

(73) Assignees: Hyundai Motor Company, Seoul (KR); Kia Motors Corporation, Seoul (KR)

( * ) Notice: Subject to any disclaimer, the term of this patent is extended or adjusted under 35 U.S.C. 154(b) by 0 days.

(21) Appl. No.: 16/167,215

(22) Filed: Oct. 22, 2018

(65) Prior Publication Data

US 2019/0315325 A1    Oct. 17, 2019

(30) Foreign Application Priority Data

Apr. 11, 2018   (KR) .................. 10-2018-0042298

(51) Int. Cl.
| | |
|---|---|
| *B60K 17/16* | (2006.01) |
| *B60T 8/92* | (2006.01) |
| *B60T 8/1761* | (2006.01) |
| *B60K 28/16* | (2006.01) |
| *B60T 17/22* | (2006.01) |
| *F16H 48/22* | (2006.01) |

(52) U.S. Cl.
CPC ................ *B60T 8/92* (2013.01); *B60K 17/20* (2013.01); *B60K 28/165* (2013.01); *B60T 8/1761* (2013.01); *B60T 17/221* (2013.01); *F16H 48/22* (2013.01); *B60T 2270/402* (2013.01); *B60T 2270/403* (2013.01)

(58) Field of Classification Search
CPC ........ B60T 8/92; B60T 8/1761; B60T 17/221; B60T 2270/403; B60T 2270/402; B60K 17/20; B60K 28/165; F16H 48/22
See application file for complete search history.

(56) References Cited

U.S. PATENT DOCUMENTS

| | | | |
|---|---|---|---|
| 5,752,751 A * | 5/1998 | Nakaura | ............... B60T 8/26 303/122.06 |
| 7,451,847 B2 | 11/2008 | Hommi | |
| 10,106,135 B2 * | 10/2018 | Coelingh | ............ G05D 1/0223 |

(Continued)

FOREIGN PATENT DOCUMENTS

| | | |
|---|---|---|
| JP | 4193534 B2 | 12/2008 |
| JP | 2017-141868 A | 8/2017 |

*Primary Examiner* — Justin Holmes
(74) *Attorney, Agent, or Firm* — Morgan, Lewis & Bockius LLP

(57) ABSTRACT

An emergency braking control system of a vehicle using a limited slip differential, may include a brake circuit formed by splitting hydraulic lines for left and right side drive wheels; a limited slip differential disposed to restrict the differential of the drive wheels; and a controller for determining whether or not the braking circuit failure occurs in a braking situation, and performing the engagement control of the limited slip differential, wherein the controller is configured to perform the engagement control of the limited slip differential to distribute a braking force to drive wheel connected to a hydraulic line where the braking circuit failure occurs when the brake circuit failure occurs in the braking situation.

18 Claims, 9 Drawing Sheets

(56) References Cited

U.S. PATENT DOCUMENTS

| | | | |
|---|---|---|---|
| 2011/0168518 A1* | 7/2011 | Hilberer | B60T 1/062 |
| | | | 192/219.4 |
| 2013/0030651 A1* | 1/2013 | Moshchuk | G08G 1/166 |
| | | | 701/41 |
| 2018/0072290 A1* | 3/2018 | Boethel | B60T 8/1708 |

* cited by examiner

<BRAKING UPON A FAILURE OF BRAKE>

<BRAKING UPON A FAILURE OF BRAKE>

<BRAKING UPON A FAILURE OF BRAKE
+ ELSD OPERATION>

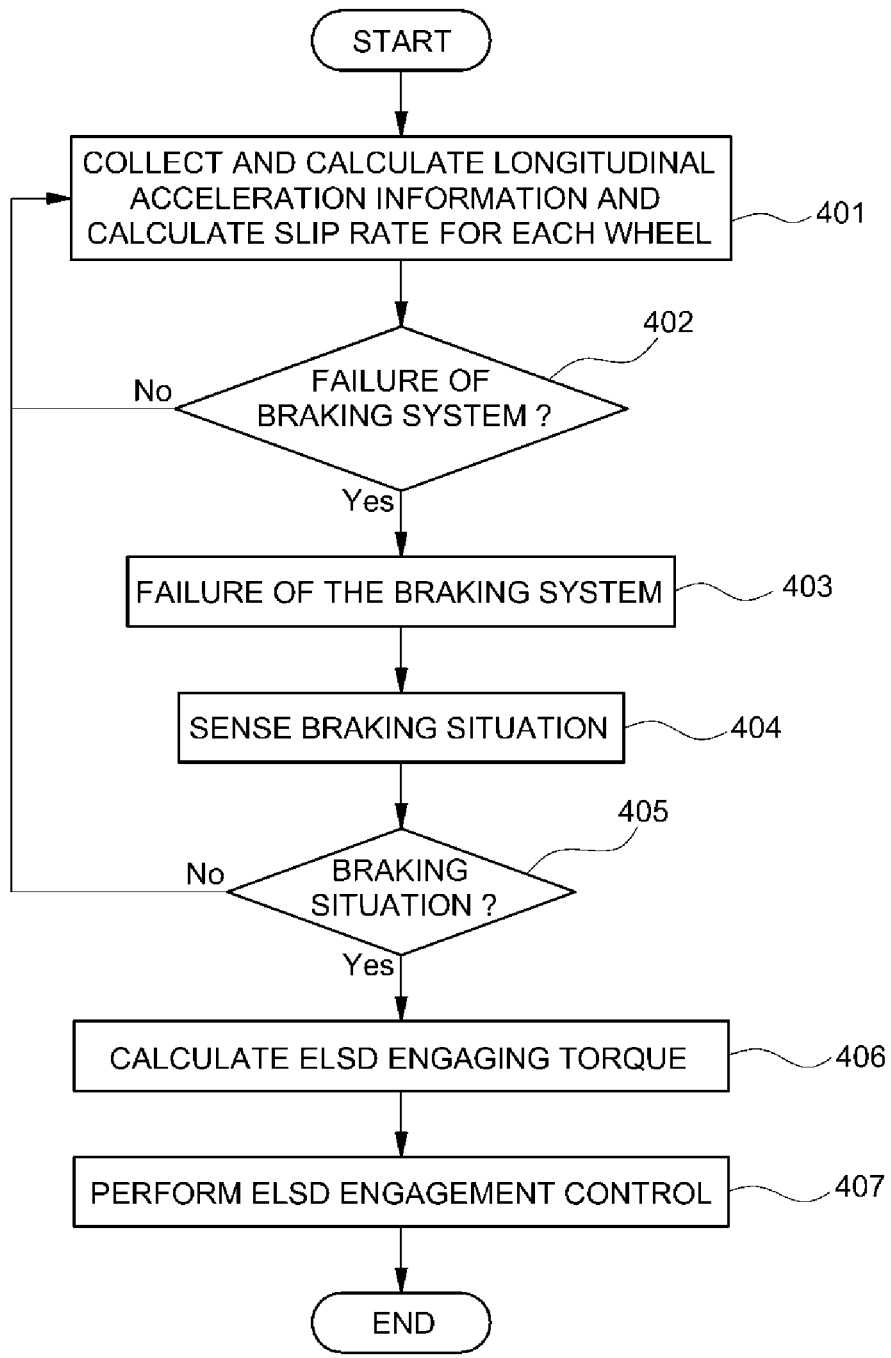

EMERGENCY BRAKING CONTROL SYSTEM USING LIMITED SLIP DIFFERENTIAL AND CONTROL METHOD THEREOF

CROSS-REFERENCE TO RELATED APPLICATION

The present application claims priority to Korean Patent Application No. 10-2018-0042298 filed on Apr. 11, 2018, the entire contents of which is incorporated herein for all purposes by this reference.

BACKGROUND OF THE INVENTION

Field of the Invention

The present invention relates to an emergency braking control system using a limited slip differential and a control method thereof, and more particularly, to an emergency braking control system using a limited slip differential and a control method thereof configured for effectively performing a braking control using the limited slip differential when a portion of pipe is broken due to oil leakage of a braking device.

Description of Related Art

A braking device is provided in a vehicle as the device configured for decelerating or stopping a driving vehicle and maintaining a parking state. This braking device is a device configured for generating a braking force for stopping the vehicle by amplifying the pedal effort of a brake pedal.

As such a braking device, a hydraulic braking device using brake oil is widely used. The hydraulic braking device can exert a large force as the pressure applied to the incompressible fluid (e.g., brake oil) contained in the enclosed container is equally delivered to all points.

FIG. 1 schematically illustrates a sequence in which a braking force is delivered from a hydraulic braking device.

When the driver braking pedal effort is delivered through the brake pedal 10, a booster 20 amplifies the driver pedal effort using the intake negative pressure of an engine. The amplified pedal effort is converted into hydraulic pressure through a master cylinder 30, and the hydraulic pressure generated in the master cylinder is delivered to a cylinder in a caliper 50 of each wheel through a hydraulic line 40. In the present time, the hydraulic pressure delivered through the hydraulic line is delivered to the caliper and the brake pad 50, and the brake pad generates the braking force by pressing the disk 60 of a rotating wheel.

Herein, when physical breakage occurs in the hydraulic line of the braking system to occur leakage of the brake oil, all of the hydraulic pressures generated by the driver pedal effort are escaped to the oil leakage point. As a result, the hydraulic pressure is not delivered to the disk connected to the hydraulic line side where the breakage has occurred, such that the braking force cannot be generated.

Accordingly, to maintain the basic braking force even when oil leakage occurs, the hydraulic line is designed to be separated for each two left and right wheels. In the instant case, even if oil leakage occurs in one pipe, the braking force may be generated by the other pipe. However, there has been a problem in that since the maximum braking force is reduced to ½ of that of the normal pipe, the braking force may be generated by two times the pedal effort in the normal situation when the braking force is generated only in the one side pipe. Furthermore, in the weak braking situation, the braking performance may be sufficiently implemented by one pipe, but in the strong braking situation, there is a limit that a sufficient braking force cannot be generated because the wheel is easily locked in the wheel connected to the normal pipe.

The information disclosed in this Background of the Invention section is only for enhancement of understanding of the general background of the invention and may not be taken as an acknowledgement or any form of suggestion that this information forms the prior art already known to a person skilled in the art.

BRIEF SUMMARY

Various aspects of the present invention are directed to providing an emergency braking control system and a control method thereof, which may be configured to deliver the braking force applied to the wheel connected to a normal hydraulic line to the wheel connected to a hydraulic line where a failure has occurred when the failure has occurred in one side line due to oil leakage, etc. In the hydraulic braking device, thus increasing the limit of the braking force which may be generated to perform more marginable braking.

For achieving the object, according to the exemplary an exemplary embodiment of the present invention, there is provided an emergency braking control method using a limited slip differential in a vehicle, including: determining, by a controller, a failure of a braking system; determining, by the controller, whether the vehicle is in a braking situation; performing, by the controller, an engagement control of a limited slip differential when the vehicle is determined as being in the braking situation while determining the failure of the braking system; and distributing the braking force to a drive wheel connected to a hydraulic line where the failure occurs by performing the engagement control of the limited slip differential.

Furthermore, there is provided an emergency braking control system of a vehicle using a limited slip differential, including: a brake circuit formed by splitting hydraulic lines for left and right side drive wheels; a limited slip differential disposed to restrict the differential of the drive wheels; and a controller for determining whether or not the braking circuit failure occurs in a braking situation, and performing the engagement control of the limited slip differential, wherein the controller is configured to perform the engagement control of the limited slip differential to distribute a braking force to drive wheel connected to a hydraulic line where the braking circuit failure occurs when the brake circuit failure occurs in the braking situation.

Accordingly, according to the emergency braking control system using the limited slip differential and the control method thereof, there is an effect in that upon a failure of the braking device, by controlling the limited slip differential to deliver the braking force applied to the wheel connected to a normal hydraulic line to a wheel connected to a hydraulic line where a failure has occurred, can perform more marginable braking.

Other aspects and exemplary embodiments of the disclosure are discussed infra.

It is understood that the term "vehicle" or "vehicular" or other similar term as used herein is inclusive of motor vehicles in general such as passenger vehicles including sports utility vehicles (SUV), buses, trucks, various commercial vehicles, watercraft including a variety of boats and ships, aircraft, and the like, and includes hybrid vehicles, electric vehicles, plug-in hybrid electric vehicles, hydrogen-powered vehicles and other alternative fuel vehicles (e.g., fuels derived from resources other than petroleum). As referred to herein, a hybrid vehicle is a vehicle that has two or more sources of power, for example both gasoline-powered and electric-powered vehicles.

The methods and apparatuses of the present invention have other features and advantages which will be apparent from or are set forth in more detail in the accompanying drawings, which are incorporated herein, and the following Detailed Description, which together serve to explain certain principles of the present invention.

The above and other features of the disclosure are discussed infra.

BRIEF DESCRIPTION OF THE DRAWINGS

FIG. 3A illustrates the example in which the braking force is generated in the situation where the limited slip differential does not operate and FIG. 3B illustrates the example in which the braking force is generated in the situation where the limited slip differential operates.

FIG. 4 is a flowchart illustrating an emergency braking control method using the limited slip differential in accordance with the exemplary embodiment of the present invention.

FIG. 5A illustrates the change in the longitudinal-directional force for each tire of front wheels depending upon whether or not the limited slip differential operates and FIG. 5B illustrates the change in a wheel speed depending on whether or not the limited slip differential operates.

FIG. 6A illustrates the change in the longitudinal-directional force for each tire of front wheels depending upon whether or not the limited slip differential operates and FIG. 6B illustrates the change in a wheel speed depending on whether or not the limited slip differential operates.

FIG. 7A illustrates the change in the longitudinal-directional force for each tire of front wheels depending upon whether or not the limited slip differential operates and FIG. 7B illustrates the change in a wheel speed depending on whether or not the limited slip differential operates.

Figure 1:
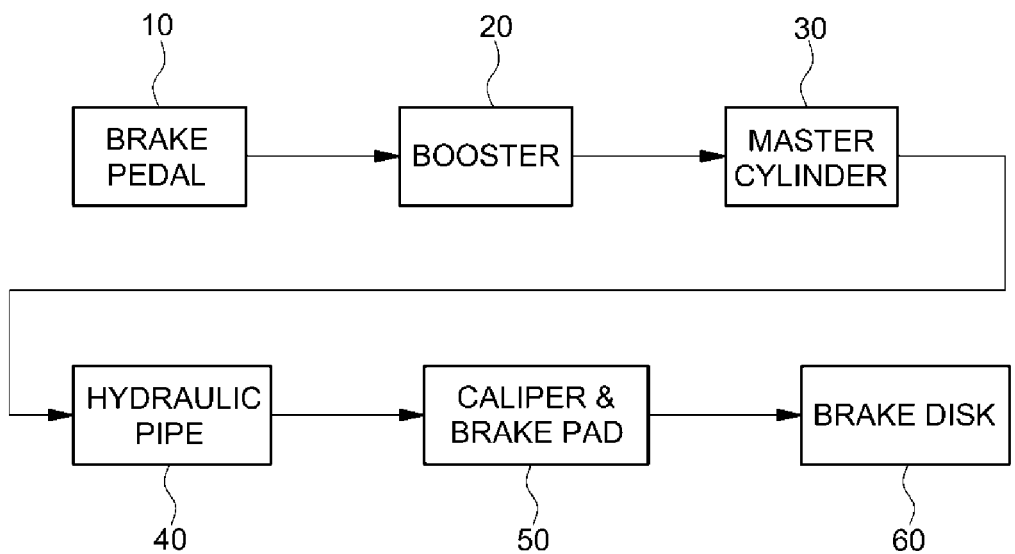
FIG. 1 schematically illustrates a sequence in which a braking force is delivered from a hydraulic braking device.

It may be understood that the appended drawings are not necessarily to scale, presenting a somewhat simplified representation of various exemplary features illustrative of the basic principles of the disclosure. The specific design features of the present invention as included herein, including, for example, specific dimensions, orientations, locations, and shapes will be determined in part by the particular intended application and use environment.

In the figures, reference numbers refer to the same or equivalent parts of the present invention throughout the several figures of the drawing.

It may be understood that the appended drawings are not necessarily to scale, presenting a somewhat simplified representation of various features illustrative of the basic principles of the present invention. The specific design features of the present invention as included herein, including, for example, specific dimensions, orientations, locations, and shapes will be determined in part by the particularly intended application and use environment.

In the figures, reference numbers refer to the same or equivalent parts of the present invention throughout the several figures of the drawing.

DETAILED DESCRIPTION

Reference will now be made in detail to various embodiments of the present invention(s), examples of which are illustrated in the accompanying drawings and described below. While the invention(s) will be described in conjunction with exemplary embodiments of the present invention, it will be understood that the present description is not intended to limit the invention(s) to those exemplary embodiments. On the other hand, the invention(s) is/are intended to cover not only the exemplary embodiments of the present invention, but also various alternatives, modifications, equivalents and other embodiments, which may be included within the spirit and scope of the invention as defined by the appended claims.

Hereinafter, various exemplary embodiments of the present invention will be described with reference to the accompanying drawings so that those skilled in the art can easily practice the present invention. However, the present invention is not limited to those exemplary embodiments and may be embodied in other forms.

In the whole description, it will be understood that when a component is referred to as being "comprising" any component, it does not exclude other components, but can further include the other components unless otherwise specified.

In the exemplary embodiment, a failure of the braking system or a failure of the brake circuit means that the braking force cannot be generated as braking hydraulic pressure is not delivered to the brake disc, as in the case where physical breakage occurs in the hydraulic line of the braking system to occur leakage of the brake oil. Accordingly, the failure of the braking system or the brake circuit may be construed to mean the case where any one of the split brake circuits fails to perform a normal function.

Hereinafter, an emergency braking control system using a limited slip differential in accordance with the exemplary embodiment of the present invention will be described in detail with reference to the accompanying drawings.

Figure 2:
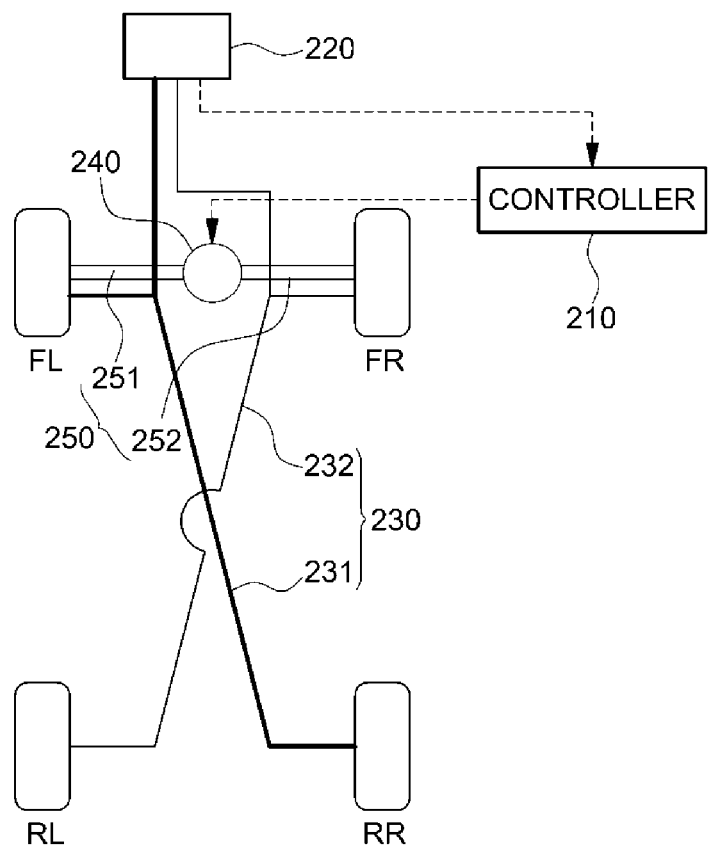
FIG. 2 illustrates a braking system including a brake circuit split into the X shape and a limited slip differential as the exemplary embodiment of the present invention.

FIG. 2 illustrates a braking system including a brake circuit split in an X shape and a limited slip differential as the exemplary embodiment of the present invention.

According to the exemplary embodiment of the present invention, it is configured to include an X-shaped split circuit designed for splitting a hydraulic line for each two left and right wheels to maintain a basic braking force even if oil leakage occurs due to physical breakage of the hydraulic line of the braking system. In the X-split brake circuit, even if oil leakage occurs in one line, the braking force may be generated by the other normal hydraulic line. As in the example of FIG. 2, a hydraulic line 230 of the X-split brake circuit is configured to receive hydraulic pressure from a master cylinder 220 side connected to a pedal portion, and to split into a first circuit 231 for connecting the left side front wheel (FL) and the right side rear wheel (RR) and a second circuit 232 for connecting the right side front wheel (FR) and the left side rear wheel (RL).

However, the present invention is a circuit in which the left and right wheels with respect to a driveshaft 250 on which a limited slip differential 240 is disposed are split, and the structure in which the corresponding left and right side wheels are engaged by the limited slip differential 240 is sufficient; and it is not limited to the X-split brake circuit. Accordingly, another exemplary embodiment of the present invention may be also provided as the H-split brake circuit including the first circuit 231 for connecting the left side front and rear wheels and the second circuit 232 for connecting the right side front and rear wheels.

Furthermore, the example of FIG. 2 is a front wheel drive vehicle, and the limited slip differential 240 for preventing the front wheel driveshaft 250 from being differentiated is disposed on the front wheel driveshaft 250. The limited slip differential 240 may be mounted on the side of the differential device and provided as a multi-plate friction clutch structure for preventing the driveshaft 250 from being differentiated. In the instant case, by operating the multi-plate friction clutch of the limited slip differential 240 to engage left and right driveshafts 251 and 252, the differential of the driveshaft 250 is prevented. However, the example of the limited slip differential 240 is not limited to the example including the multi-plate friction clutch structure, and the structure that prevents the differential of the driveshaft 250 through the limited slip differential 240 to distribute the braking force to the left and right sides is applicable without limitation. Meanwhile, according, according to the exemplary embodiment of the present invention, the Electronic Limited Slip Differential (ELSD) 240 that can restrict the differential in an electronically controlled manner is used. The electronic limited slip differential 240 is suitable for achieving the function of the emergency braking system because it can immediately control the limited slip differential 240 depending upon whether or not the braking system fails or is in the braking situation.

Since the limited slip differential 240 is similar to the brake principle, the driving force may be delivered from a high speed wheel (e.g., turning outside or a slippery road wheel) to a slow speed wheel (e.g., turning inside or high friction road wheel).

On the other hand, in an exemplary embodiment of the present invention, the limited slip differential 240 operates in the braking situation, and upon operation of the limited slip differential 240, it functions so that the front wheel braking force of the normal line is distributed to the fail line side thereof. That is, as the limited slip differential 240 operates, the left and right driveshafts 251 and 252 are engaged to distribute the normal line side front wheel braking force to the fail line side thereof.

That is, the limited slip differential 240 in accordance with various aspects of the present invention distributes the braking force by mechanically connecting the left and right side drive wheels when braking is performed in the failure state of the braking system, in addition to the general function of restricting the differential of the drive wheel. Accordingly, even if the braking force cannot be delivered through the hydraulic line 230 due to the failure of the braking system, the left and right side drive wheels are mechanically engaged through the driveshafts, such that the braking force, which is generated in the normal line that can generate the hydraulic braking force, may be distributed to the fail line side wheel.

Furthermore, according to the exemplary embodiment of the present invention, as in FIG. 2, it may be configured to include a controller 210 for controlling the operation of the limited slip differential 240. Furthermore, the controller 210 may be configured to determine whether or not the braking system fails and is in the braking situation of the vehicle, and to control the operation of the limited slip differential 240 depending upon the determined result. The controller 210 may be configured to receive information such as the pressure of the master cylinder 220 to determine the braking situation, and also to determine the braking force which may be delivered from the pressure information related to the master cylinder 220 and based on the above, to determine the engaging torque of the limited slip differential 240.

Meanwhile, it may be configured to detect whether or not a failure occurs and is in the braking situation through a separate controller different from the controller 210 of FIG. 2, and also to receive the detected information from the controller 210 for the limited slip differential 240.

Figure 3A:
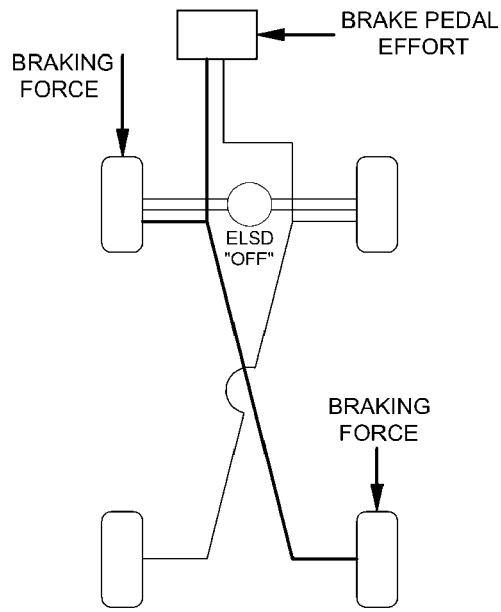
FIG. 3A and FIG. 3B illustrate examples in which a braking force is generated when a failure occurs in one side circuit of the braking system of FIG. 2.
Figure 3B:
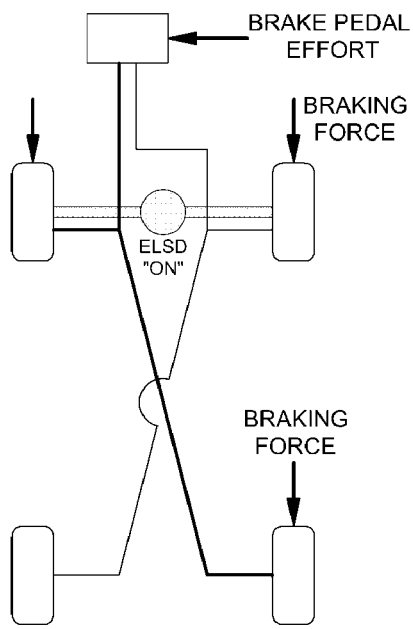

FIG. 3A and FIG. 3B illustrate examples in which the braking force is generated when a failure occurs in one side circuit of the braking system of FIG. 2.

First, FIG. 3A illustrates the example in which the braking force is generated when the limited slip differential 240 does not operate in the situation where a failure occurs in one side circuit of the braking system.

As illustrated in FIG. 3A, when the limited slip differential 240 does not operate in the situation where the second circuit 232 for connecting the front side right wheel and the rear side left wheel fails, the braking force is not generated in the second circuit 232. On the other hand, the braking force is distributed to the first circuit 231 depending upon the braking distribution ratio of the front and rear wheels.

On the other hand, FIG. 3B illustrates the example in which the braking force is distributed to the left and right side front wheels by operating the limited slip differential 240 in the situation where a failure occurs in one side circuit of the braking system.

Unlike in the example of FIG. 3A, in the example of FIG. 3B, the limited slip differential 240 operates to engage the front wheel driveshaft 250, such that the braking force of the front side left wheel of the first circuit 231 is distributed to the front side right wheel side thereof. Accordingly, unlike in FIG. 3A, the braking force is distributed to the left and right side wheels of the front wheel, respectively.

Accordingly, since the braking force may be delivered to the wheel connected to the fail line side, that is, the right side front wheel, the braking force of the left side front wheel may be relatively reduced, and as a result, sufficient braking performance may be implemented through the left and right side braking distribution even when the braking system fails.

FIG. 4 is a flowchart illustrating an emergency braking control method using the limited slip differential 240 in accordance with the exemplary embodiment of the present invention.

As illustrated in FIG. 4, according to the exemplary embodiment of the present invention, it determines whether or not the braking system fails and is in the braking situation, and when the braking situation is determined in the failure state of the braking system, performs the engagement control of the limited slip differential. In the present time, by performing the engagement control of the limited slip differential, the braking force is distributed to the line side drive wheel on which a failure occurs.

The determining of the failure of the braking system is illustrated in 401 to 403. The 401 collects and determines the information related to the longitudinal acceleration of a vehicle, and determines the slip rate for each wheel, and the 402 determines whether or not the braking system fails from the collected information.

In this regard, in the emergency braking control method using the limited slip differential in accordance with the exemplary embodiment of the present invention, in determining whether or not or not the braking system fails, the error information related to the longitudinal acceleration of the vehicle or the comparison result of the slip rate of each wheel may be used.

For example, when using the error information related to the longitudinal acceleration of the vehicle, the actual longitudinal acceleration information related to the vehicle is compared with the model longitudinal acceleration information determined from the braking input, and the failure of the braking system is determined depending upon the result.

In this regard, the actual longitudinal acceleration information related to the vehicle may be obtained by use of the longitudinal acceleration information detected from a longitudinal acceleration sensor, and the model longitudinal acceleration may be obtained by use of the model acceleration value determined from the relationship between the driver demand braking force and the vehicle weight.

The following is the Equation for determining the model longitudinal acceleration.

$$\alpha_{model} = \frac{F}{m} = \frac{nP_A}{m} \qquad \text{Equation}$$

Herein, $\alpha_{model}$ refers to the model longitudinal acceleration, n to the number of caliper cylinders, P to the pressure of the master cylinder, A to the contact area of the caliper cylinder, and m to the vehicle weight.

The controller 210 compares the model longitudinal acceleration determined from the Equation with the actual longitudinal acceleration value, and when the comparison result indicates that the model longitudinal acceleration is greater than the actual longitudinal acceleration, the failure of the braking system may be suspected.

For example, the controller 210 can store a longitudinal acceleration threshold value for determining whether or not the braking system fails, and when the difference between the determined model longitudinal acceleration and the actual longitudinal acceleration is equal to or greater than a predetermined longitudinal acceleration threshold value, may be configured to determine as the failure of the braking system.

Meanwhile, in determining whether or not the braking system fails, the comparison result of the slip rate for each wheel may be also used.

In the instant case, it may be configured to determine the slip rate for each wheel to compare the slip rates of the left and right side front wheels, and to compare the slip rates of the left and right side rear wheels. For example, considering the case of FIG. 3A in which the first circuit 231 as the X-shaped split brake circuit fails, the slip rate of the left side front wheel is much greater than the slip rate of the right side front wheel, and the slip rate of the right side rear wheel also becomes much greater than the slip rate of the left side rear wheel.

That is, according to the exemplary embodiment of the present invention, when the slip rates of the left and right side front wheels are compared, the difference between the slip rates of the left and right side rear wheels is compared, and then when the difference between the respective slip rate is equal to or greater than a predetermined respective slip rate threshold value, it may be configured to determine as the failure of the braking system.

Meanwhile, two failure determining methods of the braking system described above may be applied independently or complementarily, and it is preferable to determine whether or not the braking system fails considering both the comparison results of the longitudinal accelerations and the slip rates.

In the instant case, in determining the failure of the braking system, it may be configured to include collecting the information on the vehicle speed, the wheel speed, the longitudinal acceleration and the pressure of the master cylinder 220 of the vehicle, and determining the model longitudinal acceleration and the slip rate for each wheel from the collected information 401, comparing the determined model longitudinal acceleration with the actual longitudinal acceleration, comparing the slip rates of the front wheels, and comparing the slip rates of the rear wheels 402, and determining whether or not the braking system fails depending upon the comparison results of the longitudinal accelerations and the slip rates 403.

In the present time, when it is determined that the braking system is not in failure, the 401 and 402 are repeated, and when it is determined that the braking system is in failure, the 404 to 407 that selectively perform the engagement control of the limited slip differential depending upon the braking situation is performed.

The determining of whether or not it is in the braking situation 404 determines whether or not the braking operation is to be performed depending upon the driver braking intent.

Accordingly, the 404 may be configured to detect a brake switch input or to determine whether or not it is in the braking situation depending upon the pressure of the master cylinder 405.

In an exemplary embodiment of the present invention, the braking situation is determined to occur if the brake switch input is detected or the pressure of the master cylinder 405 is equal to or greater than a predetermined value.

Thereafter, when the braking situation is not sensed, the 401 and 402 are repeated, and when the braking situation is sensed, the engaging torque of the limited slip differential is determined in 406, and the engaging control is performed based on the engaging torque in 407.

In this regard, the 406 may be configured to determine the braking force which may be delivered from the pressure of the master cylinder, and to determine the engaging torque based on the determined braking force. Furthermore, the 407 performs the engagement control of the limited slip differential depending upon the determined engaging torque and can distribute the braking force to the fail line side drive wheel through the engagement control of the limited slip differential.

Meanwhile, although not illustrated, the performing of engagement control of the limited slip differential performs the engagement control of the limited slip differential only when the driver demand braking force exceeds a predetermined braking force threshold value, and when the driver demand braking force is equal to or smaller than the braking force threshold value, can control not to engage the limited slip differential.

This is because, when a relatively low braking force is required, problems such as the wheel locking and lack of the braking force do not occur even if the limited slip differential is not operated. On the other hand, when the driver demand braking force exceeds the predetermined braking force threshold, the wheel locking and the lack of the braking force can occur, such that the engagement control of the limited slip differential is performed as in the 406 and 407.

Figure 5A:
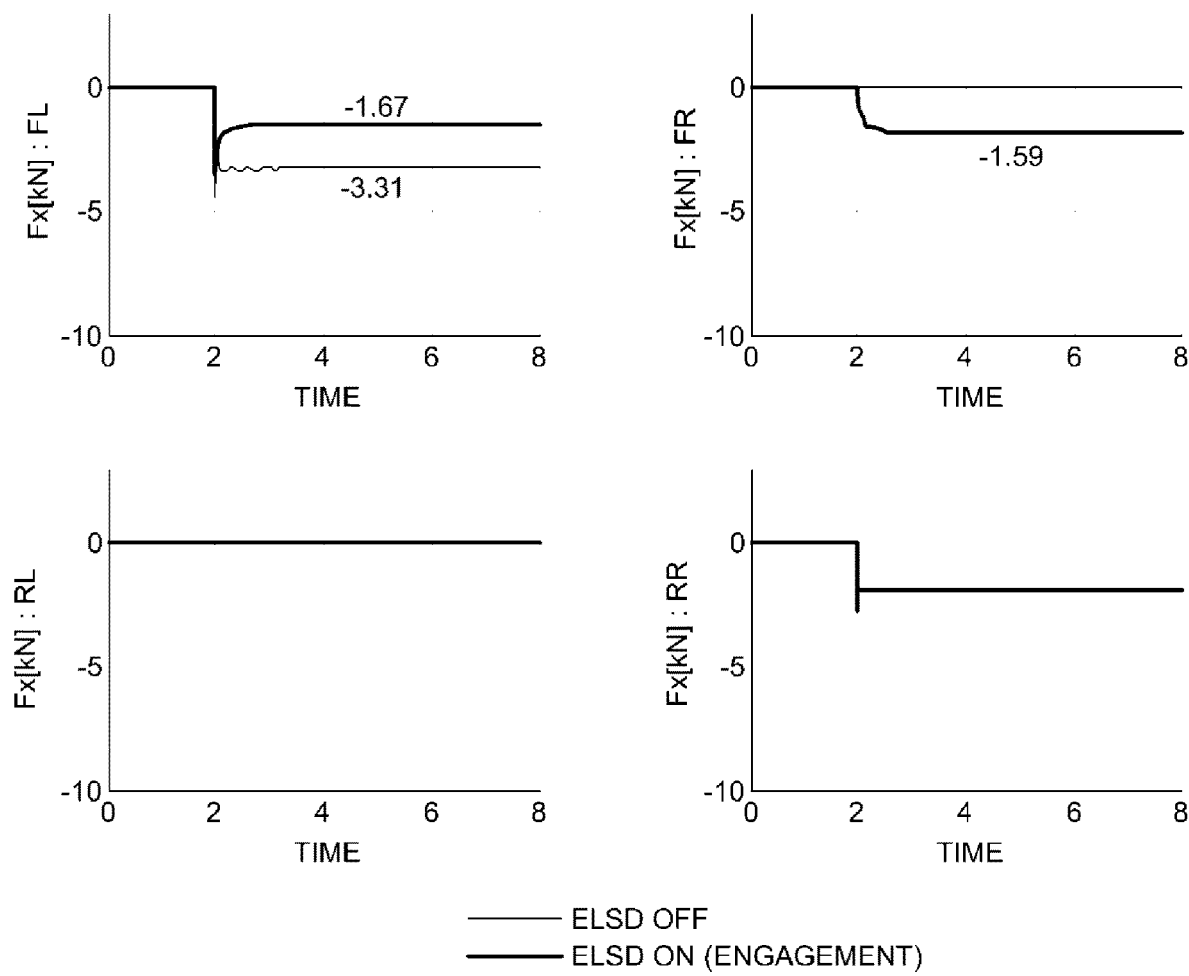
FIG. 5A and FIG. 5B illustrate test results in the low pedal effort state in which the pedal effort is low when a failure occurs in one side circuit of the braking system of FIG. 2.
Figure 5B:
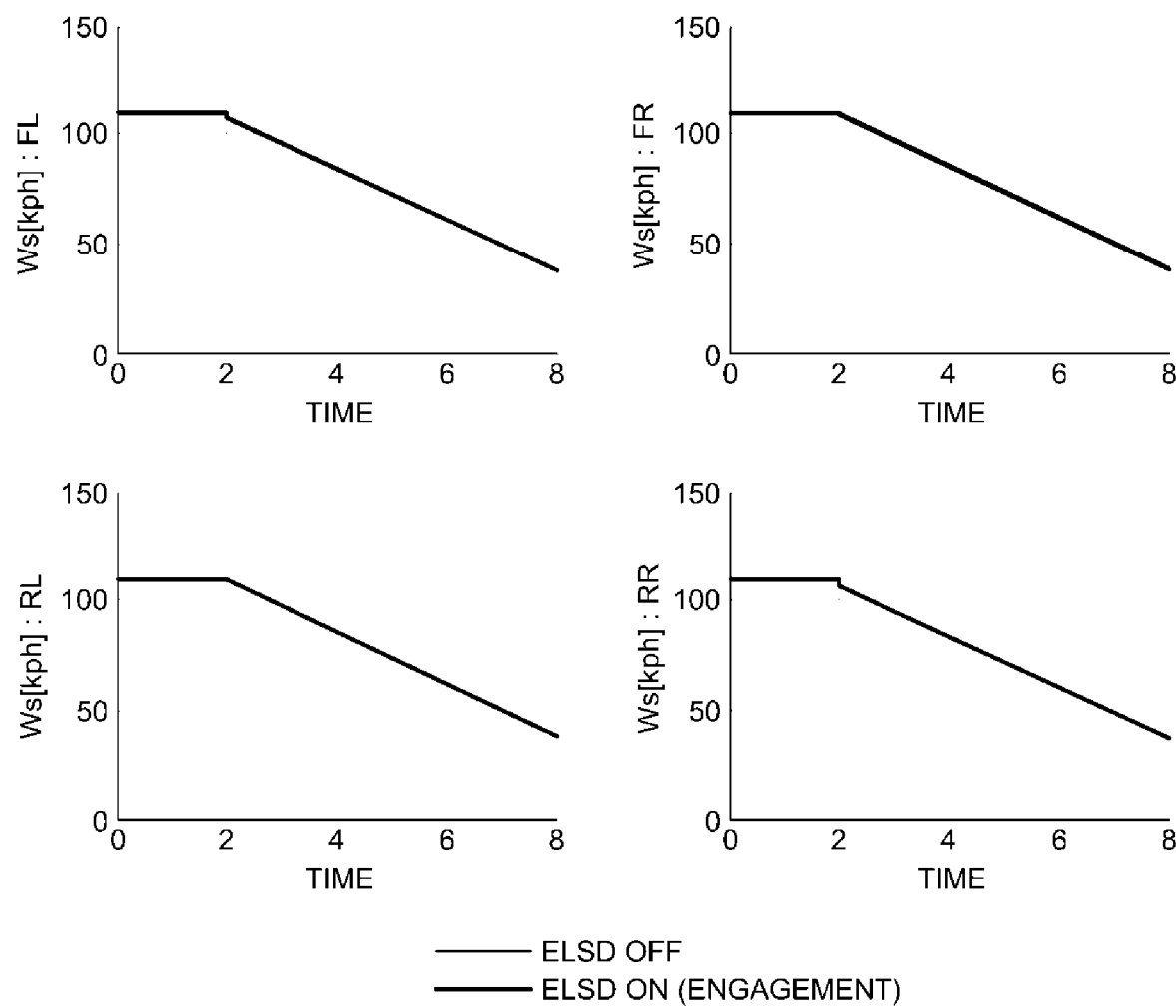

In this regard, FIG. 5A and FIG. 5B illustrate test results in a low pedal effort state in which the pedal effort is low when a failure occurs in one side circuit of the braking system of FIG. 2. FIG. 5A illustrates the change in the longitudinal-directional force for each tire of the front wheels depending on whether or not the limited slip differential operates, and FIG. 5B illustrates the change in the wheel speed depending upon whether or not the limited slip differential operates.

In the low pedal effort state, that is, in the state in which the driver demand braking force is relatively low, the wheel locking does not occur even if the limited slip differential is controlled to be in a non-operation state (OFF). However, it may be confirmed that the braking force for the fail line side wheel is generated by engaging the limited slip differential.

Figure 6A:
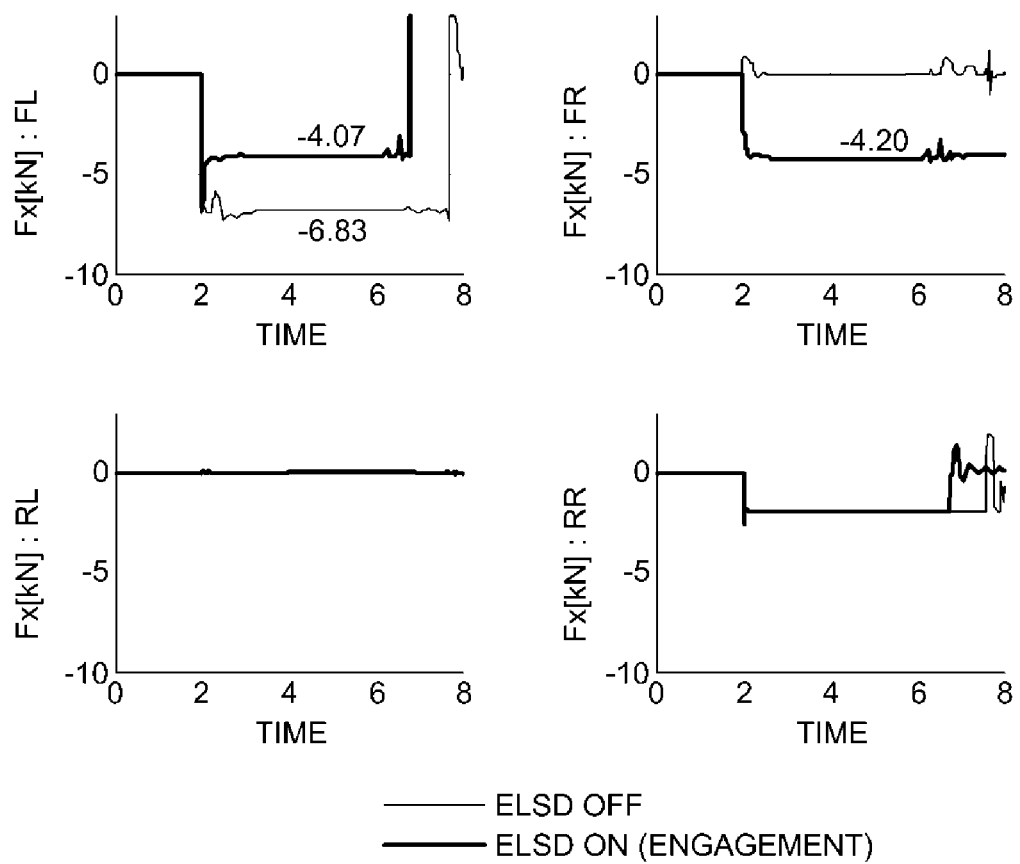
FIG. 6A and FIG. 6B illustrate test results in the high pedal effort state in which the pedal effort is relatively high when a failure occurs in one side circuit of the braking system of FIG. 2.
Figure 6B:
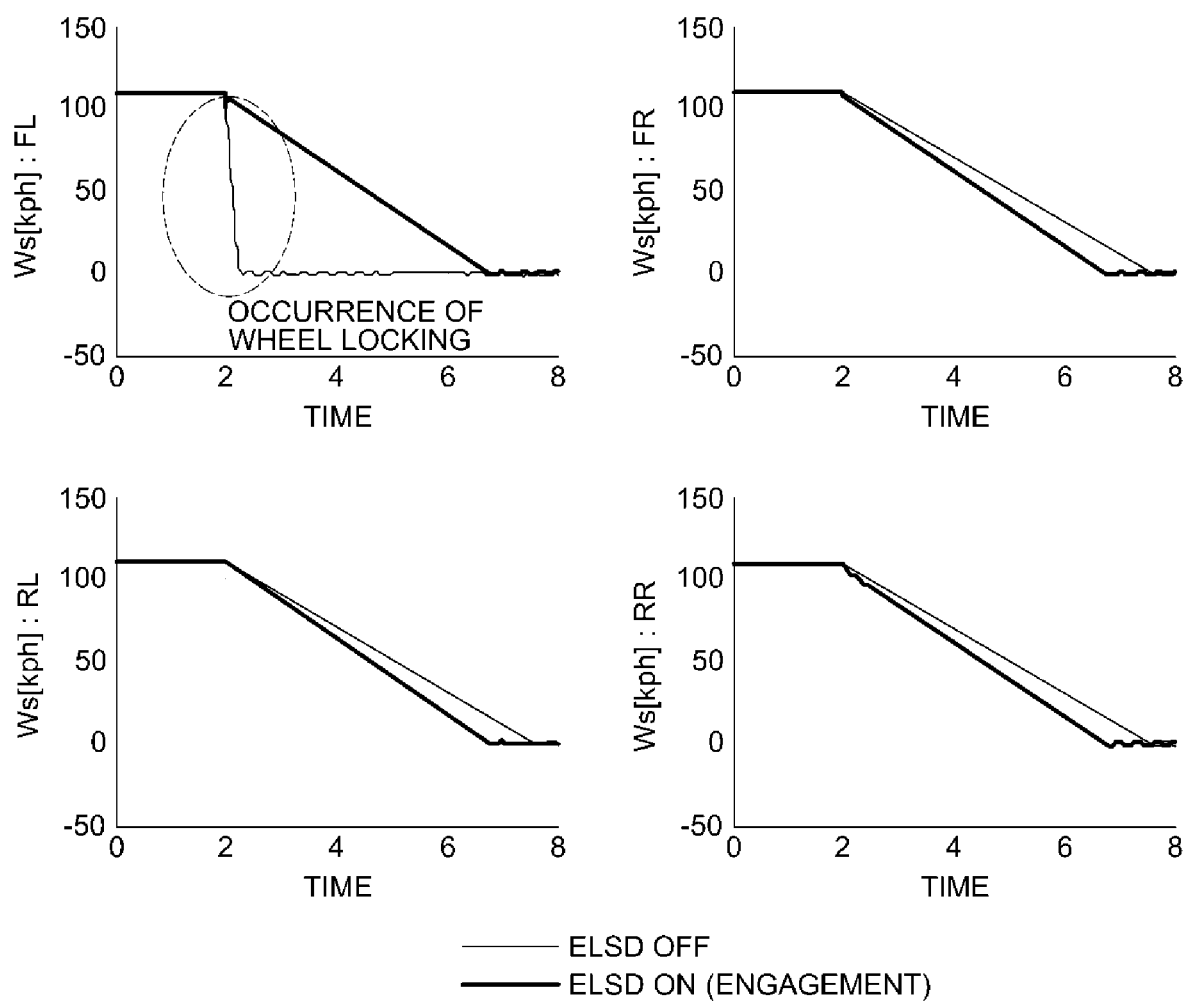

Meanwhile, FIG. 6A and FIG. 6B illustrate test results in a high pedal effort state in which the pedal effort is relatively high when a failure occurs in one side circuit of the braking system of FIG. 2. FIG. 6A illustrates the change in the longitudinal-directional force for each tire of the front wheels depending on whether or not the limited slip differential operates, and FIG. 6B illustrates the change in the wheel speed depending upon whether or not the limited slip differential operates.

In the instant case, when the limited slip differential does not operate, it may be confirmed that the wheel locking of the left side front wheel occurs.

On the other hand, when the limited slip differential operates, it may be confirmed that the braking force is distributed to the fail line side wheel as in FIG. 6A, and the wheel locking also does not occur as in FIG. 6B.

Figure 7A:
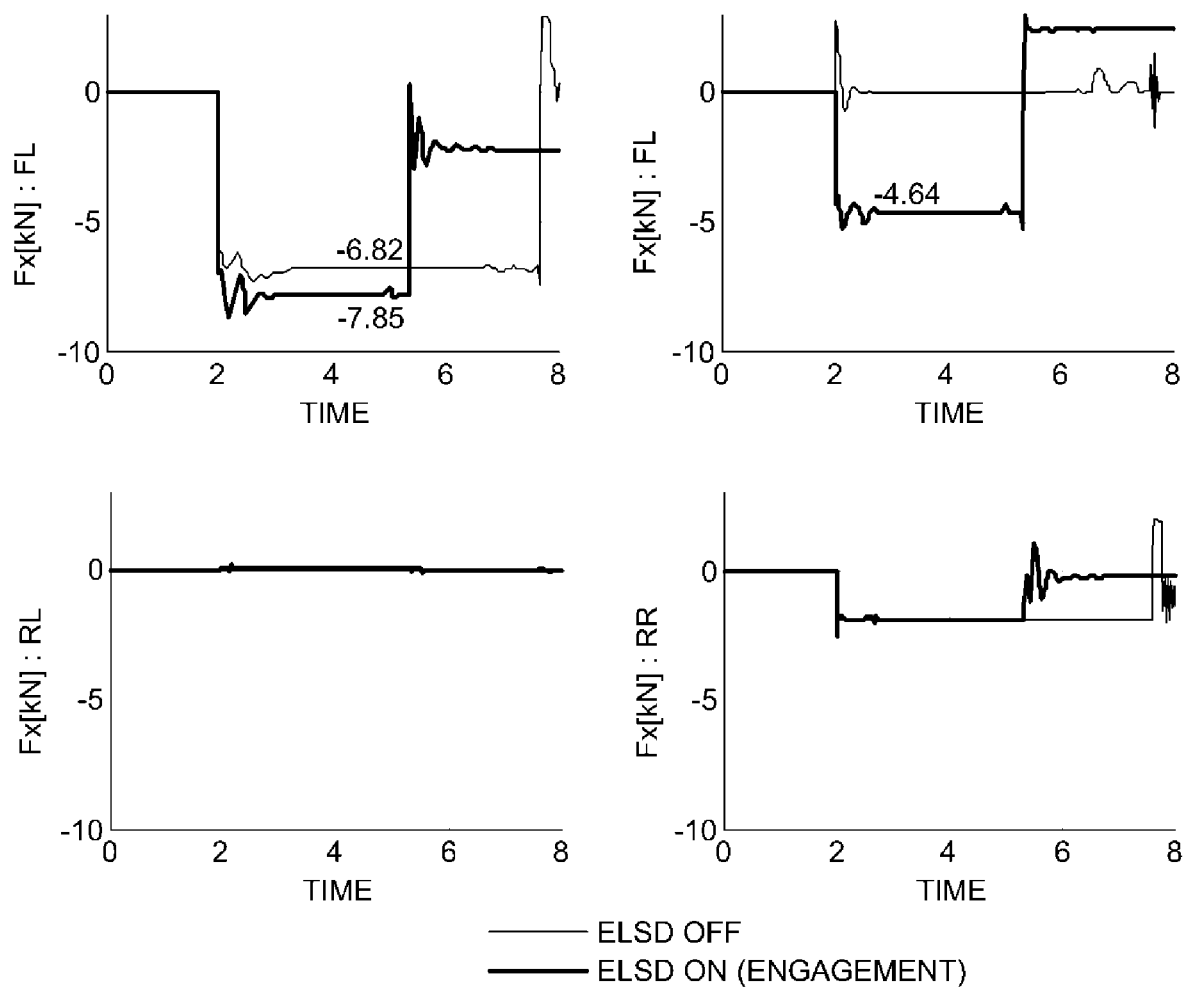
FIG. 7A and FIG. 7B illustrate test results in the ultra-high pedal effort state in which the pedal effort is higher than the example of FIG. 6A and FIG. 6B when a failure occurs in one side circuit of the braking system of FIG. 2.
Figure 7B:
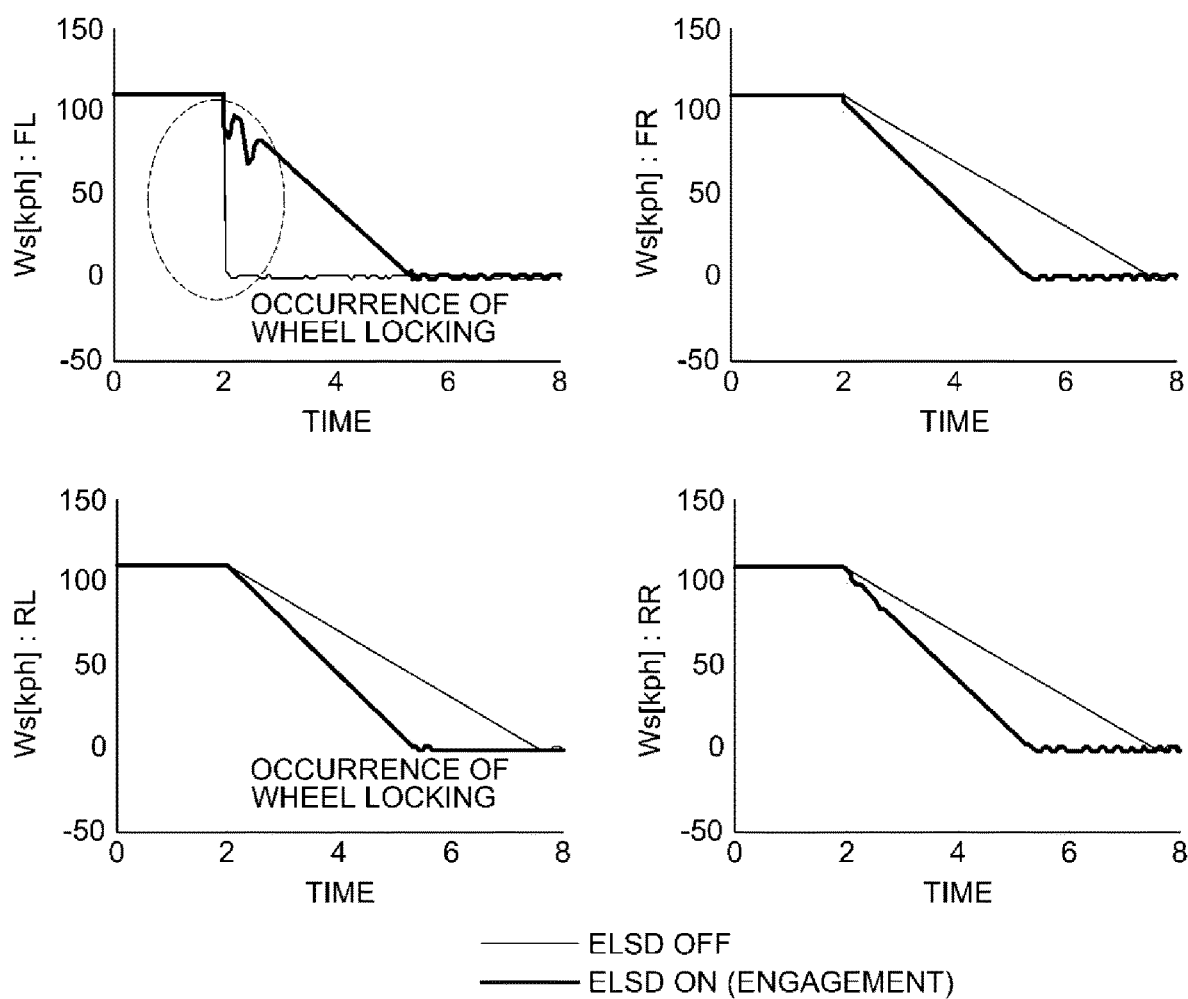

FIG. 7A and FIG. 7B illustrate test results of an ultra-high pedal effort state in which the pedal effort is higher than that in the examples of FIG. 6A and FIG. 6B when a failure occurs in one side circuit of the braking system of FIG. 2; and FIG. 7A illustrates the change in the longitudinal-directional force for each tire of the front wheels depending upon whether or not the limited slip differential operates and FIG. 7B illustrates the change in the wheel speed depending upon whether or not the limited slip differential operates.

In the cases of FIG. 7A and FIG. 7B as in the cases of FIG. 6A and FIG. 6B, it may be confirmed that the wheel locking of the left side front wheel occurs when the limited slip differential does not operate.

On the other hand, even if the limited slip differential is operated, it may be also confirmed that the braking force is distributed to the fail line side wheel as in FIG. 7A, and the wheel locking also does not occur as in FIG. 7B.

Accordingly, the braking force may be distributed to the left and right side drive wheels through the engagement control of the limited slip differential, and as a result, the practical braking force generation limit may be increased.

For convenience in explanation and accurate definition in the appended claims, the terms "upper", "lower", "inner", "outer", "up", "down", "upper", "lower", "upwards", "downwards", "front", "rear", "back", "inside", "outside", "inwardly", "outwardly", "internal", "external", "inner", "outer", "forwards", and "backwards" are used to describe features of the exemplary embodiments with reference to the positions of such features as displayed in the figures.

The foregoing descriptions of specific exemplary embodiments of the present invention have been presented for purposes of illustration and description. They are not intended to be exhaustive or to limit the invention to the precise forms disclosed, and obviously many modifications and variations are possible in light of the above teachings. The exemplary embodiments were chosen and described to explain certain principles of the invention and their practical application, to enable others skilled in the art to make and utilize various exemplary embodiments of the present invention, as well as various alternatives and modifications thereof. It is intended that the scope of the invention be defined by the Claims appended hereto and their equivalents.

What is claimed is:

1. An emergency braking control method using a limited slip differential in a vehicle, the emergency braking control method comprising:
   determining, by a controller, a failure of a braking system;
   determining, by the controller, when the vehicle is in a braking situation after the failure of the braking system is determined by the controller;
   performing, by the controller, an engagement control of the limited slip differential mounted between left and right side drive wheels among a plurality of drive wheels when the vehicle is determined as being in the braking situation while determining the failure of the braking system; and
   distributing braking force to a drive wheel among a plurality of drive wheels, the drive wheel connected to a hydraulic line where the failure occurs by performing the engagement control of the limited slip differential.

2. The emergency braking control method using the limited slip differential in the vehicle of claim 1, wherein the determining of the failure of the braking system includes:
   comparing an actual longitudinal acceleration information related to the vehicle with a model longitudinal acceleration information determined from a braking input, and
   determining as the failure of the braking system when a difference between the model longitudinal acceleration and the actual longitudinal acceleration is equal to or greater than a predetermined longitudinal acceleration threshold value.

3. The emergency braking control method using the limited slip differential in the vehicle of claim 1,
   wherein the left side drive wheel among the plurality of drive wheels includes a left side front wheel and the right side drive wheel among the plurality of drive wheels includes a right side front wheel,
   wherein the plurality of drive wheels further includes a left side rear wheel, and a right side rear wheel, and
   wherein the determining of the failure of the braking system includes:
   comparing slip rates of the left and right side front wheels, and comparing slip rates of the left and right side rear wheels by determining the slip rates for each of the left side front wheel, the right side front wheel, the left side rear wheel, and the right side rear wheel, and
   determining as the failure of the braking system when a difference between the slip rates of the left and right side front wheels and a difference between the slip rates of the left and right side rear wheels are equal to or greater than each corresponding predetermined slip rate threshold value.

4. The emergency braking control method using the limited slip differential in the vehicle of claim 1, wherein the determining of the failure of the braking system includes:
collecting information on a vehicle speed, a wheel speed, a longitudinal acceleration, and a pressure of a master cylinder in the brake system of the vehicle;
determining a model longitudinal acceleration and slip rate for each of left side front wheel, right side front wheel, left side rear wheel, and right side rear wheel of the plurality of drive wheels from the collected information;
comparing the determined model longitudinal acceleration with an actual longitudinal acceleration, comparing slip rates of the left side front and right side front wheels, and comparing slip rates of the left side rear and right side rear wheels; and
determining when the braking system fails depending upon the comparison result between the longitudinal accelerations, the comparison result between the slip rates of the left side front and right side front wheels, and the comparison result between the slip rates of the left side rear and right side rear wheels.

5. The emergency braking control method using the limited slip differential in the vehicle of claim 4, wherein the failure of the braking system is determined to occur when the difference between the slip rates of the left and right side front wheels and the difference between the slip rates of the left and right side rear wheels are equal to or greater than each corresponding predetermined slip rate threshold value.

6. The emergency braking control method using the limited slip differential in the vehicle of claim 1,
wherein the determining of when the vehicle is in the braking situation includes determining as being in the braking situation by detecting a brake switch input or determining as being in the braking situation depending upon a pressure of a master cylinder in the brake system.

7. The emergency braking control method using the limited slip differential in the vehicle of claim 6, wherein the braking situation is determined to occur when the brake switch input is detected or the pressure of the master cylinder is equal to or greater than a predetermined value.

8. The emergency braking control method using the limited slip differential in the vehicle of claim 1, wherein the performing of the engagement control of the limited slip differential includes:
determining braking force that is distributed to the plurality of drive wheels where the failure occurs, based on a pressure of a master cylinder, and determining an engaging torque based on the determined braking force; and
performing the engagement control of the limited slip differential depending upon the determined engaging torque.

9. The emergency braking control method using the limited slip differential in the vehicle of claim 1,
wherein the performing of the engagement control of the limited slip differential includes performing the engagement control of the limited slip differential when a driver demand braking force exceeds a predetermined braking force threshold value, and controlling not to engage the limited slip differential when the driver demand braking force is equal to or smaller than the braking force threshold value.

10. An emergency braking control system of a vehicle using a limited slip differential, comprising:
a brake circuit formed by splitting hydraulic lines for left and right side drive wheels among a plurality of drive wheels;
the limited slip differential mounted between the left and right side drive wheels to restrict a differential of the plurality of drive wheels; and
a controller configured for determining when a failure of the braking circuit occurs in a braking situation, and performing engagement control of the limited slip differential,
wherein the controller is configured to perform the engagement control of the limited slip differential to distribute a braking force to a drive wheel among the plurality of drive wheels, the drive wheel connected to a hydraulic line where the braking circuit failure occurs when the brake circuit failure occurs in the braking situation.

11. The emergency braking control system of the vehicle using the limited slip differential of claim 10,
wherein the controller is configured to compare an actual longitudinal acceleration information related to the vehicle with a model longitudinal acceleration information determined from a braking input, and
wherein the controller is configured to determine as the failure of the braking system when a difference between the model longitudinal acceleration and the actual longitudinal acceleration is equal to or greater than a predetermined longitudinal acceleration threshold value.

12. The emergency braking control system of the vehicle using the limited slip differential of claim 10,
wherein the brake circuit is an X-split brake circuit including a first circuit for connecting a left side front wheel among the plurality of drive wheels and a right side rear wheel among the plurality of drive wheels and a second circuit for connecting a right side front wheel among the plurality of drive wheels and a left side rear wheel among the plurality of drive wheels.

13. The emergency braking control system of the vehicle using the limited slip differential of claim 12,
wherein the controller is configured to determine as the failure of the braking circuit when a difference between slip rates of the left and right side front wheels and a difference between slip rates of the left and right side rear wheels are equal to or greater than each corresponding predetermined slip rate threshold value by determining the slip rates of each of the left side front wheel, the right side front wheel, the left side rear wheel, and the right side rear wheel.

14. The emergency braking control system of the vehicle using the limited slip differential of claim 10, further including a master cylinder connected to the brake circuit, wherein the controller is configured to determine as the braking situation by detecting a brake switch input or determine as the braking situation depending upon a pressure of the master cylinder.

15. The emergency braking control system of the vehicle using the limited slip differential of claim 14, wherein the braking situation is determined to occur when the brake switch input is detected or the pressure of the master cylinder is equal to or greater than a predetermined value.

16. The emergency braking control system of the vehicle using the limited slip differential of claim 10, further including a master cylinder connected to the brake circuit,
wherein the controller is configured to determine the braking force that is distributed to the drive wheel among the plurality of drive wheels where the failure occurs, based on a pressure of the master cylinder, and to determine an engaging torque based on the determined braking force, and wherein the controller is configured to perform the engagement control of the limited slip differential depending upon the determined engaging torque.

17. The emergency braking control system of the vehicle using the limited slip differential of claim 10, wherein the controller is configured to store a predetermined braking force threshold value information, wherein the controller is configured to perform the engagement control of the limited slip differential when a driver demand braking force exceeds a predetermined braking force threshold value, and wherein the controller is configured to control not to engage the limited slip differential when the driver demand braking force is equal to or smaller than the braking force threshold value.

18. The emergency braking control system of the vehicle using the limited slip differential of claim 10, wherein the limited slip differential is an electronic limited slip differential.

* * * * *